(12) United States Patent
Chu et al.

(10) Patent No.: US 7,796,487 B2
(45) Date of Patent: Sep. 14, 2010

(54) OPTICAL SYSTEM FOR DATA STORAGE DEVICES

(75) Inventors: Patrick Breckow Chu, Wexford, PA (US); Mark Ian Lutwyche, Mars, PA (US); Tim Rausch, Gibsonia, PA (US); William Albert Challener, Sewickley, PA (US); Thomas Dean Milster, Tucson, AZ (US)

(73) Assignee: Seagate Technology LLC, Scotts Valley, CA (US)

( * ) Notice: Subject to any disclaimer, the term of this patent is extended or adjusted under 35 U.S.C. 154(b) by 1527 days.

(21) Appl. No.: 11/125,556

(22) Filed: May 10, 2005

(65) Prior Publication Data

US 2006/0256694 A1  Nov. 16, 2006

(51) Int. Cl.
*G11B 7/00* (2006.01)

(52) U.S. Cl. ............... 369/112.01; 369/112.1; 369/13.1; 369/13.2; 369/13.12; 369/13.32; 369/226; 369/53.29; 369/53.27; 369/47.49; 369/47.4; 369/40.1; 369/30.97

(58) Field of Classification Search ............. 369/112.1, 369/13.1, 13.12, 13.2, 13.32, 226, 53.29, 369/53.27, 47.49, 47.4, 40.1, 30.97
See application file for complete search history.

(56) References Cited

U.S. PATENT DOCUMENTS

| | | | | |
|---|---|---|---|---|
| 3,900,726 | A | * | 8/1975 | Tichenor ............ 362/269 |
| 4,294,515 | A | * | 10/1981 | Kaufman ............ 353/29 |
| 4,568,982 | A | * | 2/1986 | Follett ............ 348/203 |
| 4,692,024 | A | * | 9/1987 | Bloss ............ 356/135 |
| 5,850,375 | A | | 12/1998 | Wilde et al. |
| 5,889,641 | A | | 3/1999 | Belser et al. |
| 5,930,434 | A | | 7/1999 | Mowry et al. |
| 6,034,938 | A | | 3/2000 | Heanue et al. |
| 6,044,056 | A | | 3/2000 | Wilde et al. |
| 6,058,094 | A | | 5/2000 | Davis et al. |
| 6,061,323 | A | | 5/2000 | Jerman et al. |
| 6,081,499 | A | | 6/2000 | Berger et al. |
| 6,091,673 | A | * | 7/2000 | Murakami et al. ....... 369/13.12 |
| 6,324,129 | B1 | | 11/2001 | Durnin et al. |
| 6,414,911 | B1 | | 7/2002 | Wilde et al. |
| 6,483,797 | B1 | * | 11/2002 | Oakley et al. .......... 369/112.01 |

(Continued)

OTHER PUBLICATIONS

U.S. Appl. No. 10/718,162, filed Nov. 20, 2003, Peng.

(Continued)

*Primary Examiner*—Joseph H Feild
*Assistant Examiner*—Ifedayo Iluyomade
(74) *Attorney, Agent, or Firm*—Robert P. Lenart, Esq.; Pietragallo Gordon Alfano Bosick & Raspanti, LLP

(57) ABSTRACT

An apparatus includes a moveable arm for positioning an optical transducer adjacent to a storage medium, a light source, and an elliptical or ellipsoid shaped mirror mounted for reflecting light from the light source to the optical transducer. The elliptical mirror can be positioned on an ellipse, the moveable arm can pivot about an axis passing through a first focus of the ellipse, and the light source can direct light from a point on a second axis passing through a second focus of the ellipse to the elliptical minor. The light source can include a fixed laser and a moveable mirror mounted to pivot about the second axis or a moveable laser mounted to pivot about the second axis. A method performed by the apparatus is also provided.

18 Claims, 10 Drawing Sheets

U.S. PATENT DOCUMENTS

| | | |
|---|---|---|
| 6,535,473 B1 | 3/2003 | Swanson et al. |
| 6,545,970 B2 | 4/2003 | Durnin et al. |
| 6,728,015 B2 * | 4/2004 | Ohkawa et al. .......... 359/216.1 |
| 6,795,630 B2 | 9/2004 | Challener et al. |
| 6,917,486 B2 * | 7/2005 | Tanner ..................... 360/75 |
| 7,345,840 B2 * | 3/2008 | Gomez et al. ............... 360/59 |
| 2002/0003752 A1 | 1/2002 | Fuji et al. |
| 2003/0103440 A1 | 6/2003 | Kim |
| 2003/0133166 A1 * | 7/2003 | Yamanaka et al. ........... 358/300 |
| 2004/0001420 A1 * | 1/2004 | Challener .............. 369/112.27 |
| 2004/0062503 A1 | 4/2004 | Challener |
| 2004/0120064 A1 | 6/2004 | Dugas et al. |
| 2004/0160886 A1 * | 8/2004 | Ma et al. ................ 369/112.27 |
| 2005/0157627 A1 * | 7/2005 | Kanazawa et al. .......... 369/125 |
| 2005/0158728 A1 * | 7/2005 | Focaracci et al. ............... 435/6 |
| 2005/0190682 A1 * | 9/2005 | Gage et al. ............. 369/112.29 |
| 2006/0233061 A1 * | 10/2006 | Rausch et al. ............ 369/13.32 |

OTHER PUBLICATIONS

U.S. Appl. No. 10/854,564, filed May 26, 2004, Gomez et al.

U.S. Appl. No. 10/811,609, filed Jun. 30, 2004, Rausch.

* cited by examiner

OPTICAL SYSTEM FOR DATA STORAGE DEVICES

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices, and more particularly to such devices that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For HAMR, a tightly confined, high power laser light spot is used to preheat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells. Heat assisted magnetic recording can be applied to any type of magnetic storage media, including tilted media, longitudinal media, perpendicular media and patterned media.

One of the requirements for a heat assisted magnetic recording drive is an effective way to couple light from a laser diode or fiber to a coupling grating on a transducer on the slider. A number of light delivery methods have been suggested to date which require substantial changes in slider, suspension, or actuator arm (E-block) designs. In most cases, the suggested structures alter the inertia, moment, and/or thermal load of the head gimbal assembly or arm assembly such that the mechanical performance, robustness, and reliability of the drive system are compromised.

An alternative light delivery method which imposes minimal changes to existing HGA/actuator arm assembly would be desirable.

SUMMARY OF THE INVENTION

This invention provides an apparatus comprising a moveable arm for positioning an optical transducer adjacent to a storage medium, a light source, and an elliptical or ellipsoid shaped mirror mounted for reflecting light from the light source to the optical transducer.

The elliptical mirror can be positioned on an ellipse, the moveable arm can pivot about a first axis passing through a first focus of the ellipse, and the light source can direct light from a point on a second axis passing through a second focus of the ellipse to the elliptical mirror. The light source can comprise a fixed laser and a moveable mirror mounted to pivot about the second axis or a moveable laser mounted to pivot about the second axis.

In another aspect, the invention provides a method comprising: providing a moveable arm for positioning an optical transducer adjacent to a storage medium, providing a light source, and using an elliptical or ellipsoid shaped mirror mounted to reflect light from the light source to the optical transducer.

DETAILED DESCRIPTION OF THE INVENTION

Figure 1:
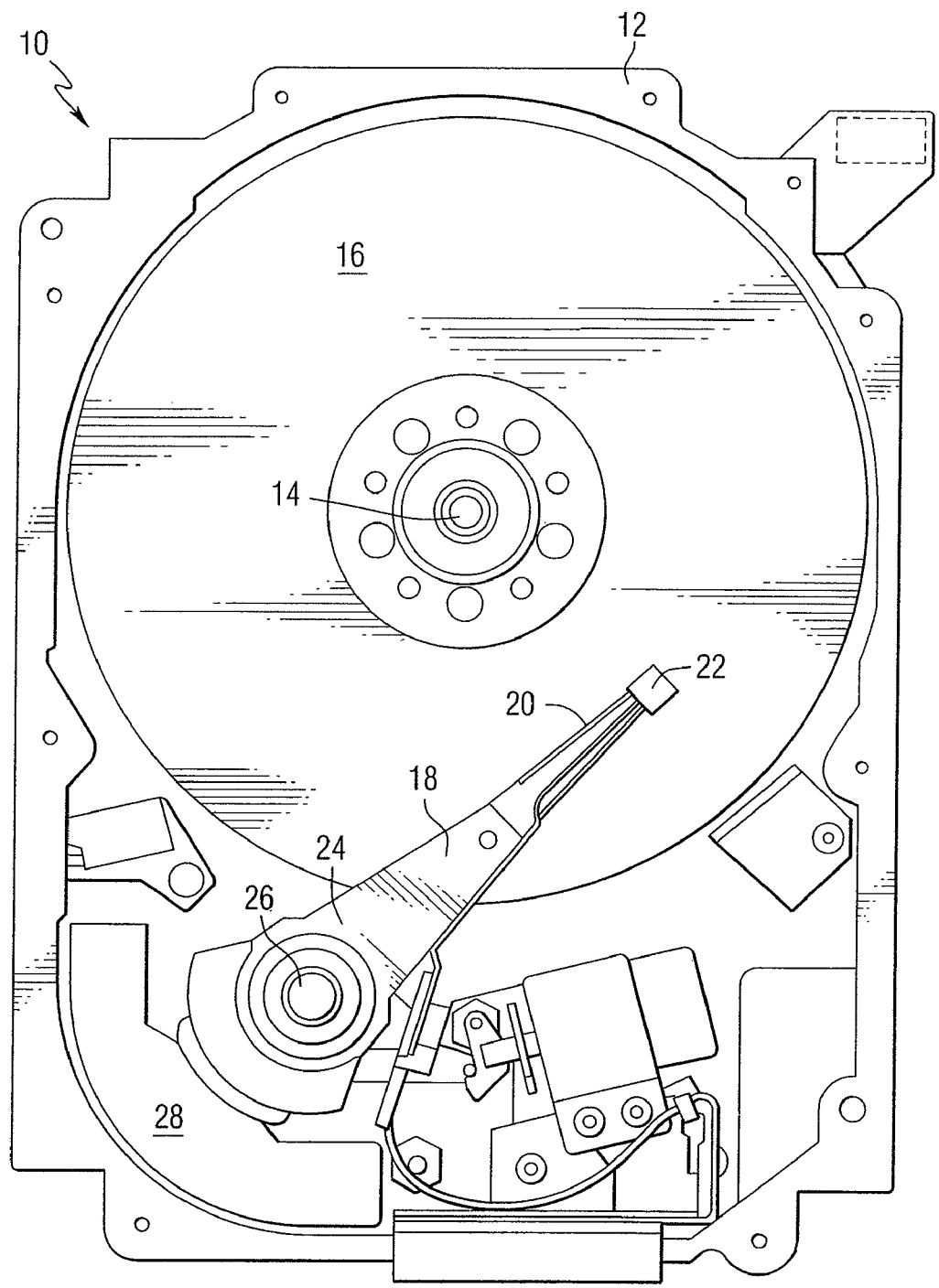
FIG. 1 is a pictorial representation of the mechanical portion of a disc drive that can be constructed in accordance with the invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor, 28 is located at the arm's second end 24, for pivoting the arm 18 to position the head 22 over a desired sector of the disc 16. The actuator motor 28 is regulated by a controller that is not shown in this view.

Figure 2:
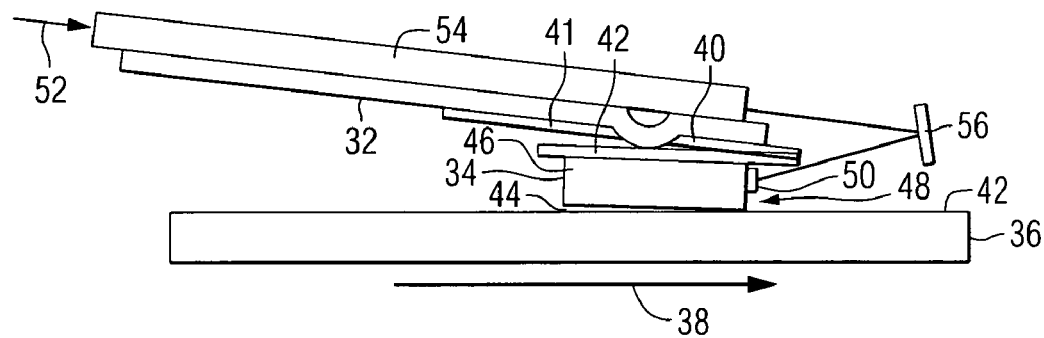
FIG. 2 is a side view of a portion of an actuator arm and an associated slider.

FIG. 2 is a schematic representation of a portion of a suspension arm 32 and slider 34, in combination with a magnetic recording disc 36. During writing and/or reading of data, the disc moves relative to the slider in a direction indicated by arrow 38. The slider is coupled to the suspension arm by a gimbal assembly 40 positioned adjacent to a surface 42 of the disc and separated from the surface of the disc by an air bearing 44. The gimbal assembly includes a first portion 41 connected to the suspension arm 32 and a second portion 42 connected to the slider 34. The second portion is cantilevered to the first portion. The slider has a leading, or front, end 46 and a trailing, or back, end 48. The leading end faces toward the pivot point of the suspension arm and the trailing end faces away from the pivot point of the suspension arm. The slider includes an optical transducer 50 mounted adjacent to the trailing end. A laser produces a beam of light illustrated by arrow 52 that is transmitted toward the slider by an optical fiber 54. A mirror 56 is mounted at the end of the suspension arm to reflect the light toward the optical transducer. The prism or mirror directs the light from the fiber onto the transducer on the slider.

This invention eliminates the need for the optical fiber of FIG. 2 by using an elliptical or ellipsoid shaped mirror, a steerable mirror, and a stationary source of electromagnetic radiation, such as a laser, for delivering light to the optical transducer positioned adjacent to a recording medium. The optical transducer can be located at the trailing edge of a slider of a conventional HGA/arm assembly.

Figure 3:
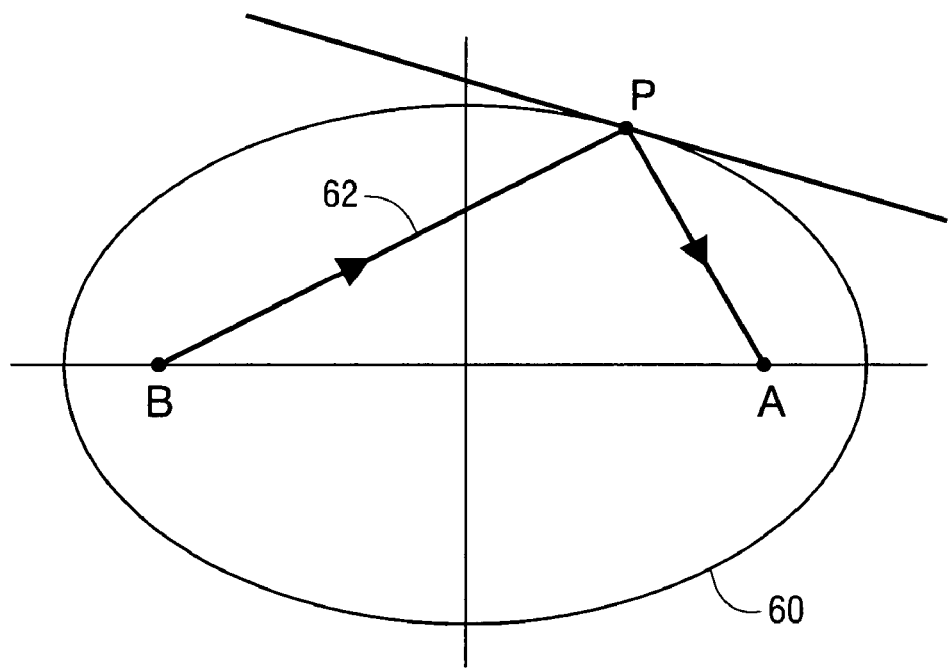
FIG. 3 is a diagram showing the reflective property of an elliptical mirror.

It is well known that all rays extended from one focus of an elliptical mirror will be reflected to the other focus. This concept is illustrated in FIG. 3, for an ellipse 60 having foci A and B. A ray 62 emanating from focus B is reflected at point P and directed toward focus A. A similar reflection would occur if the ray were reflected from any point on the ellipse.

Figure 4:
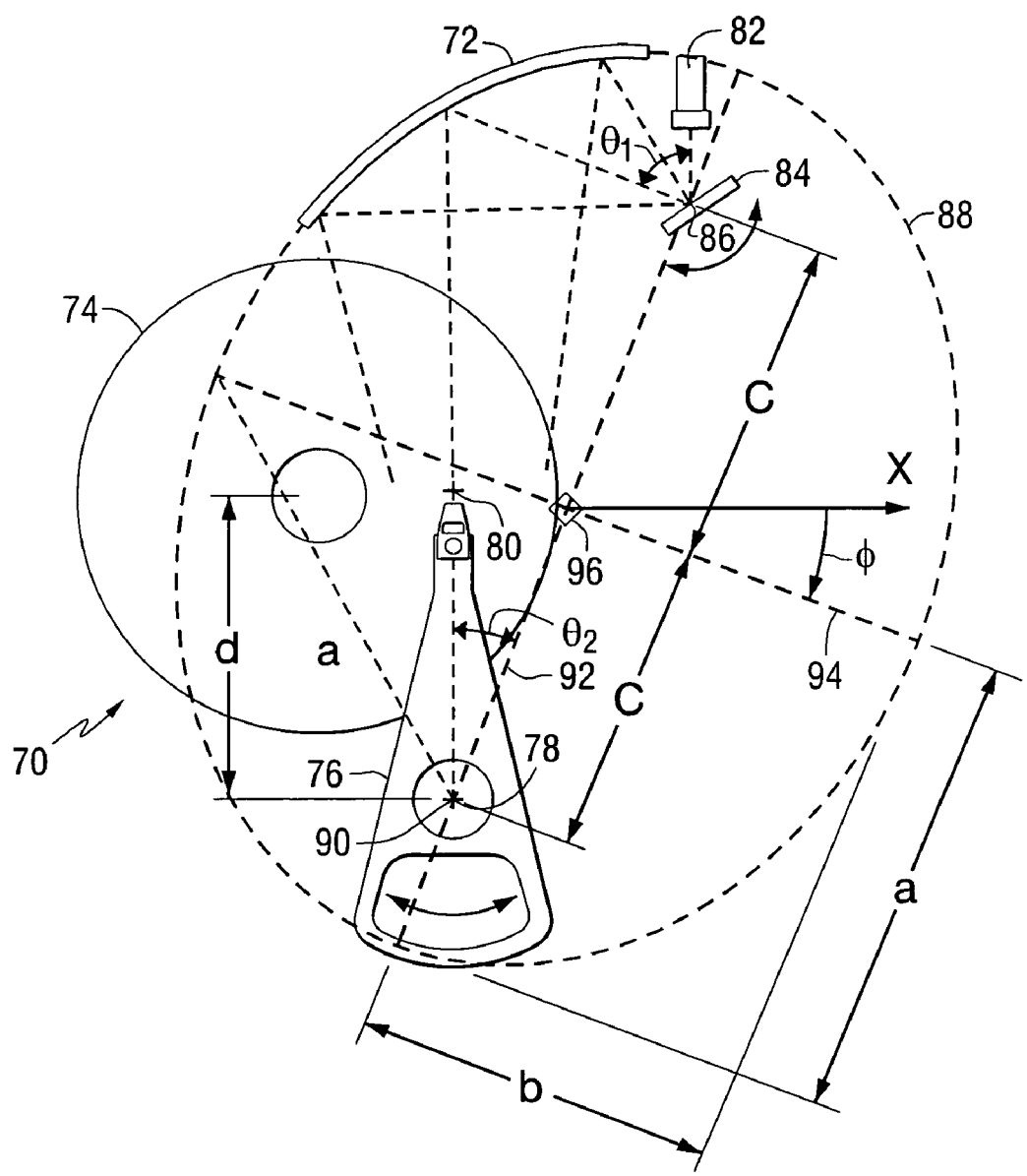
FIG. 4 is a schematic diagram of a HAMR drive with an elliptical mirror for light delivery.

FIG. 4 is a schematic diagram of a HAMR disc drive 70 including an elliptical mirror 72 having a reflective surface that lies on an ellipse 88. In some embodiments, the ellipse 88 lies on a plane passing through an ellipsoid. As used in this description, an elliptical mirror refers to a mirror that lies on a portion of right elliptical cylinder and an ellipsoid shaped mirror refers to a mirror that lies on a portion of a fully ellipsoidal surface.

The disc drive includes a storage medium in the form of a disc 74 and an actuator arm 76 mounted to pivot about a pivot axis 78. The actuator arm positions a slider 80 adjacent to a surface of the disc. The slider includes an optical transducer that may include a planar waveguide and a coupling structure, such as a grating, for coupling light into the waveguide. Light that is incident onto the coupling structure is coupled into the waveguide and then directed to the surface of the disc. A source of electromagnetic radiation 82, also referred to herein as a light source, which may be a laser or a laser module with associated focusing optics, is mounted in a fixed position in the drive. The light source produces a beam of light that is directed toward a steerable mirror 84 (also called a steering mirror) having an axis of rotation positioned at a focus 86 of ellipse 88. The pivot axis 78 of the actuator arm is positioned at a second focus 90 of the ellipse.

The two foci 86 and 90 of the ellipse define the locations of the centers of rotation of the actuator arm 76 and the steerable mirror 84. The output beam of the stationary laser module (that is properly collimated and focused) hits the steering mirror 84, which reflects the light to the elliptical mirror 72. Because of the optical properties of the elliptical mirrors described above, the light will be reflected in a direction toward the center of the rotation (pivot axis) of the actuator arm. If the angle of rotation $\theta_1$ of the steerable mirror is selected properly as a function of the angle of rotation $\theta_2$ of the actuator arm, the reflected light from the elliptical mirror will be directed toward the trailing edge of the slider.

The shape of the ellipse in FIG. 4 is defined by dimensions a and b, where a>b, and where 2a is the length of the ellipse along its major axis 92 and 2b is the height of the ellipse (along its minor axis 94). Each of the foci 86 and 90 is located along the major axis at a distance c from the center 96 of the ellipse, where $c^2 = a^2 - b^2$.

Dimension d represents the distance from the slider trailing edge (at the optical transducer) to the center of rotation of the actuator arm at pivot point 78. The ellipse is rotated by an angle $\phi$ with respect to the horizontal (x) axis. The optical path length from the steering mirror is therefore 2a-d, and is constant for all angles of rotation of the actuator arm. A constant optical path length is important, so that the spot size on the grating coupler of the optical transducer will also remain constant.

For 65 mm disc, a and b could be in the order of 60 mm and 40 mm. The optimal values for a, b, and $\phi$ may depend on a number of factors. To minimize alignment sensitivity, it is desirable to minimize the optical path length (2a). Depending on the cost of the mirror material and the weight of the material, it may be desirable to minimize the arc length of the mirror. Furthermore, the added elliptical mirror, laser, and steering mirror may also need to fit in a compact area, which limits the feasible locations of the focus of the ellipse about which the steering mirror rotates.

The steering mirror as shown in FIG. 4 only requires one degree of freedom, although two degrees of freedom (pitch and roll) could be helpful for compensating various tolerances. For every degree of rotation of the actuator arm, the steering mirror only turns about a half degree. However, the exact angular relationship depends on the shape of the ellipse and the value of $\phi$, that is, the tilt of the ellipse. Therefore, the optical configuration as shown reduces the required range of motion of the steering mirror. Alternatively, the steering mirror may be eliminated and a rotatable laser may be mounted at the focus 86. In that case, while the component count is reduced, the range of motion of the rotation for the laser must roughly equal to the range of the actuator arm.

This steering mirror may be a small micromachined microelectromechanical system (MEMS) mirror or a larger bulk mirror made of any of a variety of possible materials. The dimensions of the mirror could be very small, and defined by the desired laser spot size at that location of the optical path. For shock, disturbance, bandwidth, and actuation power considerations, it is desirable to minimize the size and mass of the mirror. Since the motion of the steering mirror (or the rotating laser) and actuator arm are linearly coupled, it is conceivable that the same voice-coil actuator would turn both of them with the use of a coupling mechanism such as a gear train. The use of a custom designed non-linear gear can achieve the synchronization of the voice-coil actuator angle and steering mirror angle. Alternatively, a second rotary actuator may be used to move the steering mirror (or the rotatable laser). The motion of the steering mirror (or the rotating laser) and actuator arm can be linearly coupled, or more precisely, the two motions can be monotonically coupled.

A second rotary actuator may be a small voice coil motor (VCM) such as one currently found in drive products. On top of such a VCM may be mounted a one-axis micro-electromechanical system (MEMS) steering mirror to achieve a combined two-axis beam steering.

The elliptical or ellipsoid shaped mirror may be mounted vertically as shown in FIG. 4, normal to the plane of the recording disc. However, since an optical grating coupler requires a non-zero angle of pitch for the incident beam, either the steering mirror or the laser source must be mounted at an angle with respect to the normal of the plane of the grating. The elliptical or ellipsoid shaped mirror may be mounted on or integral with a cover of a disc drive or a damping plate within a disc drive.

For a multi-disc, multi-head drive, a single elliptical or ellipsoid shaped mirror and a single steering mirror can be used to service all the heads. In that case, both components could be mounted vertically. The array of heads can be serviced by a column of individual laser units. In the ideal case, each individual laser should be adjustable in both static z-position and pitch angle to accommodate any potential component tolerances and drive-level stack-up tolerances. After the one-time position and/or angular adjustments, the components would be fixed permanently during the driving assembly process. If the disc-to-disc/head-to-head variations are small, it is conceivable that a rigid column of laser modules may be aligned and permanently mounted onto the drive as a single unit. It is also conceivable that all the light delivery opto-mechanics (elliptical mirror, actuated steering mirror, and laser source) could be pre-assembled together as one unit, with setscrews for fine alignment adjustments during drive-level assembly.

The size and position of the ellipse may vary. In addition, the location of center of the ellipse may vary. While the elliptical or ellipsoid shaped mirror, made of glass or other material with a polished reflective surface, may reside outside of the confines of the disc stack as shown in FIG. 4, in an alternative embodiment the mirror could be made of the reflected edges of a stack of plates inserted in between (also above and below) the stack of recording discs. These plates may not only serve as disc dampers but also reduce the optical path length and dimension of the drive system.

Figure 5:
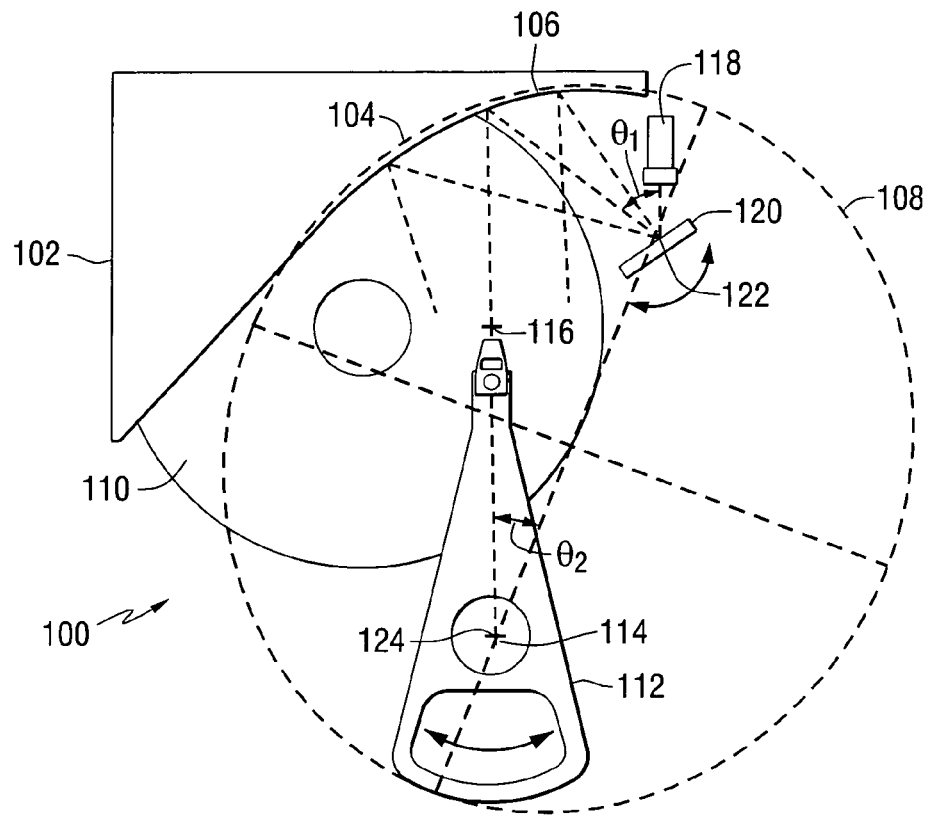
FIG. 5 is a top view of an elliptical mirror implemented using a damper plate.

FIG. 5 is a schematic diagram of a HAMR disc drive 100 including a damper 102 having an elliptical or ellipsoid shaped edge 104 that forms an elliptical or ellipsoid shaped mirror 106 having a reflective surface that lies on an ellipse 108. The disc drive includes a storage medium in the form of a disc 110 and an actuator arm 112 mounted to pivot about a pivot axis 114. The actuator arm positions a slider 116 adjacent to a surface of the disc. The slider includes an optical transducer that may include a planar waveguide and a coupling structure, such as a grating, for coupling light into the waveguide. Light that is incident to the coupling structure is coupled into the waveguide and then directed to the surface of the disc. A source of electromagnetic radiation 118, also referred to herein as a light source, which may be a laser or a laser module with associated focusing optics, is mounted in a fixed position in the drive. The light source produces a beam of light that is directed toward a steerable mirror 120 (also called a steering mirror) having an axis of rotation positioned at a focus 122 of ellipse 108. The pivot axis 114 of the actuator arm is positioned at a second focus 124 of the ellipse.

The two foci 122 and 124 of the ellipse define the locations of the centers of rotation of the actuator arm 112 and the steerable mirror 120. The output beam of the stationary laser module (which is properly collimated and focused) hits the steering mirror which reflects the light to the elliptical mirror 106. Because of the optical properties of the elliptical mirrors described above, the light will be reflected in a direction toward the center of the rotation (pivot axis) of the actuator arm. If the angle of rotation $\theta_1$ of the steerable mirror is selected properly as a function of the angle of rotation $\theta_2$ of the actuator arm, the reflected light from the elliptical mirror will be directed toward the trailing edge of the slider.

While FIG. 5 shows a single damper plate, the invention encompasses disc drives with multiple damper plates. The damping plates may be designed not only to have the elliptically curved or ellipsoid shaped edge to fulfill the optical requirement but also to have a shape that satisfies the fluid dynamic requirements for damping.

The angular relationship between the actuator arm and the steering mirror (or a rotating laser) will now be explained. Consider the ellipse in FIG. 6, where a is one half the length of the major axis, b is one half the length of the minor axis, c is the distance from the foci to the center of the ellipse, r is the distance from focus A to a reflection point P, r' is the distance from focus B to a reflection point P, and $\alpha$, $\alpha'$, $\beta$ and $\theta$ are the angles shown in the figure. Applying Mollweide's equation to the triangle APB gives, $$(r+r')\sin\frac{\theta}{2} = 2c\cos\frac{\alpha-\beta}{2} \tag{1}$$

By definition $\theta=\pi-\beta-\alpha$ and $r+r'=2a$, therefore, $$2a\cos\frac{\alpha+\beta}{2} = 2c\cos\frac{\alpha-\beta}{2} \tag{2}$$

Using the sum of cosines gives, $$a\left(\cos\frac{\alpha}{2}\cos\frac{\beta}{2} - \sin\frac{\alpha}{2}\sin\frac{\beta}{2}\right) = c\left(\cos\frac{\alpha}{2}\cos\frac{\beta}{2} + \sin\frac{\alpha}{2}\sin\frac{\beta}{2}\right) \tag{3}$$

which can be rearranged to give $$\tan\frac{\alpha}{2}\tan\frac{\beta}{2} = \frac{a-c}{a+c}. \tag{4}$$

Therefore the relationship between $\alpha$ and $\beta$ is, $$\beta = 2\tan^{-1}\left(\frac{a-c}{a+c}\cot\frac{\alpha}{2}\right). \tag{5}$$

Figure 6:
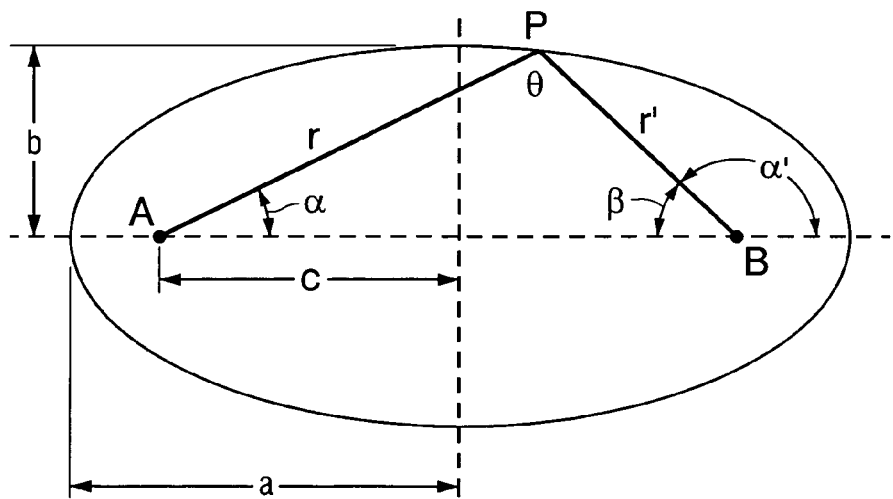
FIG. 6 is a diagram of an ellipse in terms of $\alpha$, $\alpha'$ and $\beta$.

It is more natural to use the angle $\alpha'$ in FIG. 6 so a substitution of $\alpha'$ with $\beta$ gives $$\alpha' = \pi - 2\tan^{-1}\left(\frac{a-c}{a+c}\cot\frac{\alpha}{2}\right). \tag{6}$$

Figure 7:
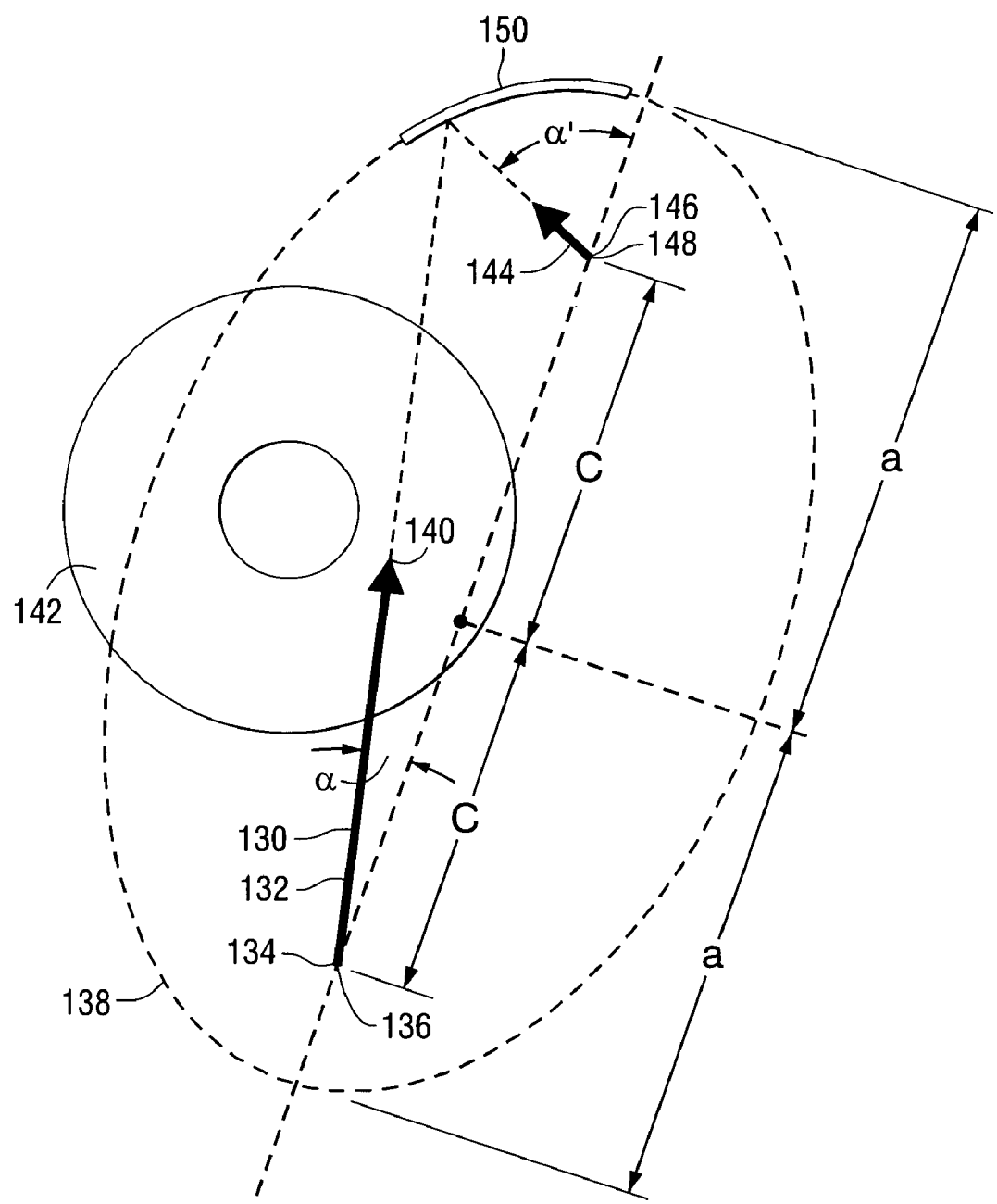
FIG. 7 is a diagram of an ellipse and a recording disc.

The orientation of the ellipse within the drive is shown in FIG. 7. In FIG. 7, arrow 130 represents an actuator arm 132 that pivots about a pivot axis 134 located at a first focus 136 of ellipse 138. An optical transducer would be located near the end 140 of the actuator arm and positioned adjacent to the disc 142. A steerable mirror or laser source illustrated by arrow 144 would be mounted to pivot about an axis 146 at a second focus 148. For this discussion, assume that a laser, instead of a steering mirror, is being rotated. The arrow 144 shows the direction of light from the laser. The dashed ellipse defines the reflective surfaces where the solid portion 150 of the ellipse represents the part that is actually made into a mirror.

Figure 8:
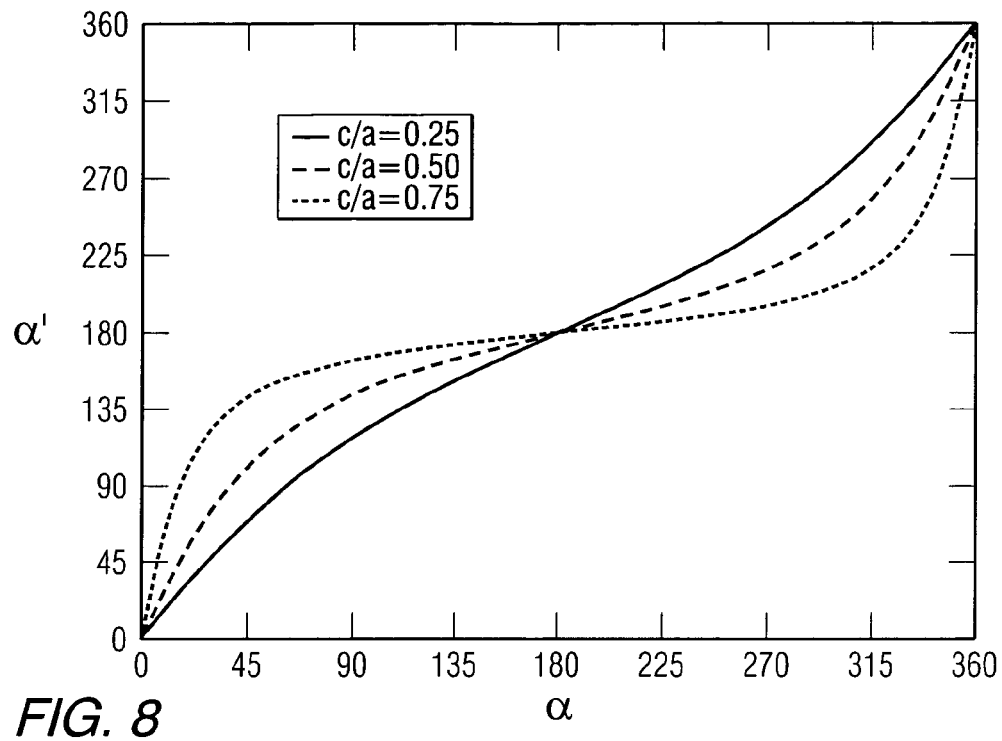
FIG. 8 is a plot of $\alpha'$ as a function of $\alpha$.
Figure 9:
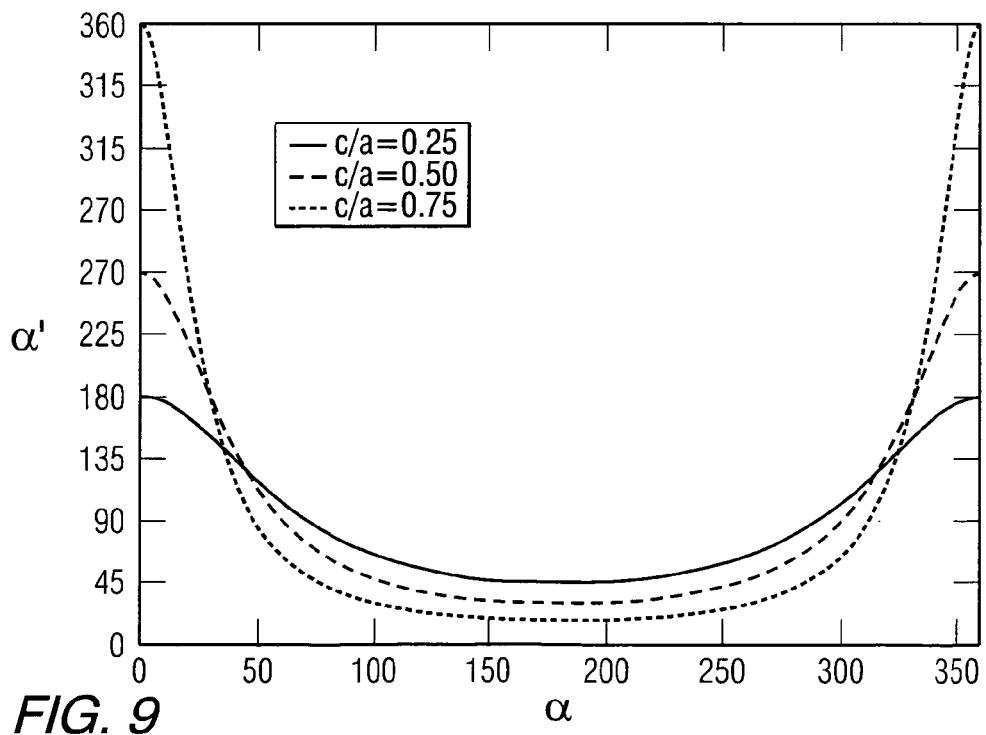
FIG. 9 is a plot of the derivative of $\alpha'$ as a function of $\alpha$.

The relationship between $\alpha'$ and $\alpha$ is shown in FIG. 8 for different ratios of c/a. This relationship is monotonic but not linear for the full range of $\alpha$ ($0<\alpha<360$). A non-linear gear train can be designed to achieve this angular relationship between $\alpha'$ and $\alpha$. In the case where the laser is being actuated, to simplify controller design and to relax electronics requirements, a linear transfer function is desirable (although not required) for the angular range of interest (corresponding to the full stroke of the voice-coil actuator). From FIG. 8, there are different regions for each c/a ratio that should be avoided. For example for a c/a ratio of 0.75 the relationship between α' and α is very nonlinear around 45°. The most desirable operating point is where the curves in FIG. 8 are straight or where the derivative remains a constant. The derivative of equation 6 is given by, $$\frac{d\alpha'}{d\alpha} = \frac{\left(\frac{a-c}{a+c}\right)\csc^2\frac{\alpha}{2}}{1+\left(\frac{a-c}{a+c}\right)^2\cot^2\frac{\alpha}{2}} \tag{7}$$

and is plotted in FIG. 9.

Figure 10:
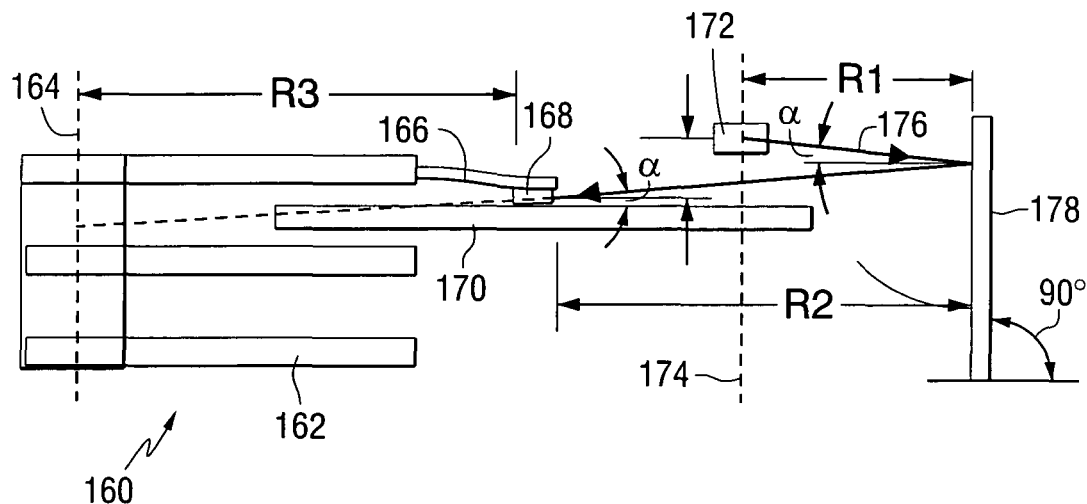
FIG. 10 is a schematic representation of a portion of a multiple disc drive.

If an independent actuator is used to rotate a laser located at focus 148, α' as derived will be the target angle of the actuator. If a steering mirror is being actuated, the target angle for the actuator is defined such that the reflected beam of the steering mirror is pointed in the direction of α'. The relationship between α and α' can easily be stored in a look-up table. Open-loop control of the actuator may be adequate depending on the available angular tolerance budget for the grating (about half a degree for all the tolerances). A servo may be used to improve accuracy and to reduce settling time in achieving the target angle. The servo feedback signal may be generated from a quad position detector based on a portion of reflected light from the steering mirror (or from the rotating laser source) via a beam splitter. On the other hand, instead of using an indirect angular reference, an alternative embodiment would measure reflected light from the slider as a feedback signal for the servo.

invention also encompasses multi-disc systems as illustrated in FIG. 10. FIG. 10 is a side view of an actuator arm 160 including an E-block 162, that is mounted to pivot about an axis 164 that is located at a first focus of an ellipse. The E-block can support a plurality of suspensions, such as suspension 166, that are used to position a plurality of recording heads, such as recording head 168, adjacent to surfaces of a disc 170. A rotatable laser or steering mirror 172 that pivots about an axis 174 that passes through a second focus of the ellipse, produces a beam 176 that reflects off of an elliptical mirror 178 and toward a transducer on each recording head. The system of FIG. 10 illustrates the use of a right elliptical mirror.

Either the laser source or the steering mirror is tilted to achieve the desired angle α. Drives that include multiple discs can use multiple steering mirrors or a linearly actuated single steering mirror with one shared large right elliptical mirror beyond the discs or segments of elliptical mirrors between the discs.

A vertical actuator can be used to actuate a single laser to service multiple discs. This approach would eliminate the use of a laser array. In addition, it is optional to add another degree of freedom (in pitch) to the steering mirror to compensate dynamically for vertical runout (in other words, instead of using a single axis steering mirror, use a two-axis mirror having a large range in yaw but a small range in pitch). A two-axis steering mirror may be implemented using a gimbaled mirror or a single-axis mirror mounted on a small-angle actuated tilting stage. R1 is the distance between the laser or steering mirror and the elliptical mirror. R2 is the distance between the elliptical mirror and the transducer. R3 is the distance between the arm pivot axis and the transducer.

Figure 11:
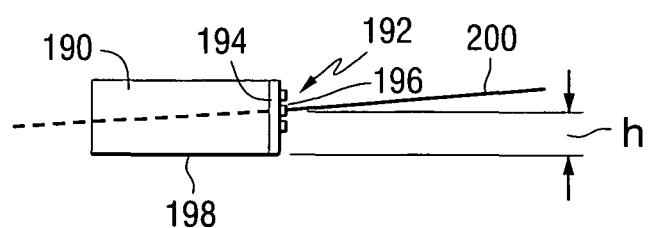
FIG. 11 is a side view of a slider.

FIG. 11 is a side view of a slider 190 that includes an optical transducer 192 having a planar waveguide 194 and a grating coupler 196. Dimension h represents the distance between the air bearing surface 198 of the slider and the center of the light beam 200. The angle α is the grating angle of incidence. It is also the downward angle at which the light beam leaves the laser or steering mirror. These two angles are identical if the mirror is a right elliptical mirror.

Either laser source or steering mirror may be tilted to achieve the proper angle α. Since R1+R2=constant, light from the steering mirror drops a distance d=(R1+R2) sin α, which is independent of the actuator angle (α' in FIG. 7) and is, therefore, guaranteed to hit the slider grating at a constant angle α and height h for all actuator angles.

Figure 12:
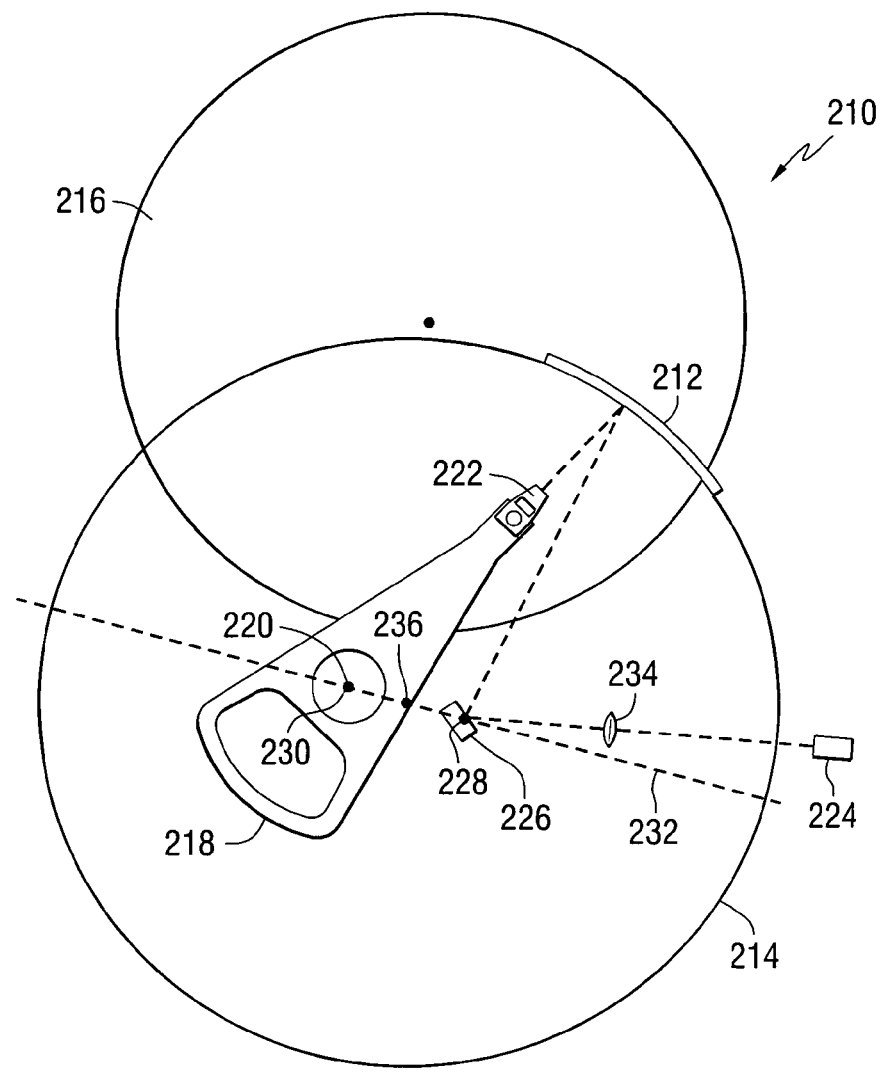
FIGS. 12 and 13 are schematic diagrams of HAMR drives with an elliptical mirror for light delivery.

FIG. 12 is a schematic diagram of a HAMR disc drive 210 including an elliptical mirror 212 having a reflective surface that lies on an ellipse 214. The disc drive includes a storage medium in the form of a disc 216 and an actuator arm 218 mounted to pivot about a pivot axis 220. The actuator arm positions a slider 222 adjacent to a surface of the disc. The slider includes an optical transducer that may include a planar waveguide and a coupling structure, such as a grating, for coupling light into the waveguide. Light that is incident onto the coupling structure is coupled into the waveguide and then directed to the surface of the disc. A source of electromagnetic radiation 224, also referred to herein as a light source, which may be a laser or a laser module with associated focusing optics, is mounted in a fixed position in the drive. The light source produces a beam of light that is directed toward a steerable mirror 226 (also called a steering mirror) having an axis of rotation positioned at a focus 228 of ellipse 214. The pivot axis 220 of the actuator arm is positioned at a second focus 230 of the ellipse.

The two foci 228 and 230 of the ellipse define the locations of the centers of rotation of the actuator arm 218 and the steerable mirror 226. The output beam of the stationary laser module (that is properly collimated and focused) hits the steering mirror 226, which reflects the light to the elliptical mirror 212. Because of the optical properties of the elliptical mirrors described above, the light will be reflected in a direction toward the center of the rotation (pivot axis) of the actuator arm. If the angle of rotation $\theta_1$ of the steerable mirror is selected properly as a function of the angle of rotation $\theta_2$ of the actuator arm, the reflected light from the elliptical mirror will be directed toward the trailing edge of the slider.

The shape of the ellipse in FIG. 12 is defined by dimensions a and b, where a>b, and where 2a is the length of the ellipse along its major axis 232 and 2b is the height of the ellipse (along its minor axis). Each of the foci 228 and 230 is located along the major axis at a distance c from the center 236 of the ellipse, where $c^2=a^2-b^2$. Dimensions a, b and c are defined in FIG. 7.

An aspherical lens 234 (or other optics) is needed for a system with a straight elliptical mirror because the elliptical mirror only focuses the incident beam from the steering mirror in one axis. The system of FIG. 12 may alternatively use an ellipsoid mirror, in which case an aspherical lens may not be needed to focus the light.

The smallest spot size to which a beam of light can be focused in the "far field" is governed by the diffraction limit. Because light is a wave, it cannot be focused to a single point. Light diffracts from the edges of the focusing lens, which in turn limits the minimum spot size. The full width at half maximum for a Gaussian focused spot is approximated by the equation $$d_{FWHM} = \frac{0.51 \cdot \lambda}{NA} \tag{8}$$

where λ is the wavelength of the light, and NA is the numerical aperture of the lens is equal to $n \cdot \sin\theta = D/(2 \cdot f)$ where n is the refractive index of the medium in which the light is focusing, D is the diameter of the lens and f is its focal length. In general the smallest spot size in the diffraction limit is about half a wavelength. An optical system which can condense at least 90% of the incident light into this theoretical minimum is generally termed "diffraction-limited." In the systems of this invention, a diffraction-limited spot is achieved at the slider grating by focusing the laser source directly on the slider (rather than at the steering mirror located at the focus of the ellipse).

Figure 13:
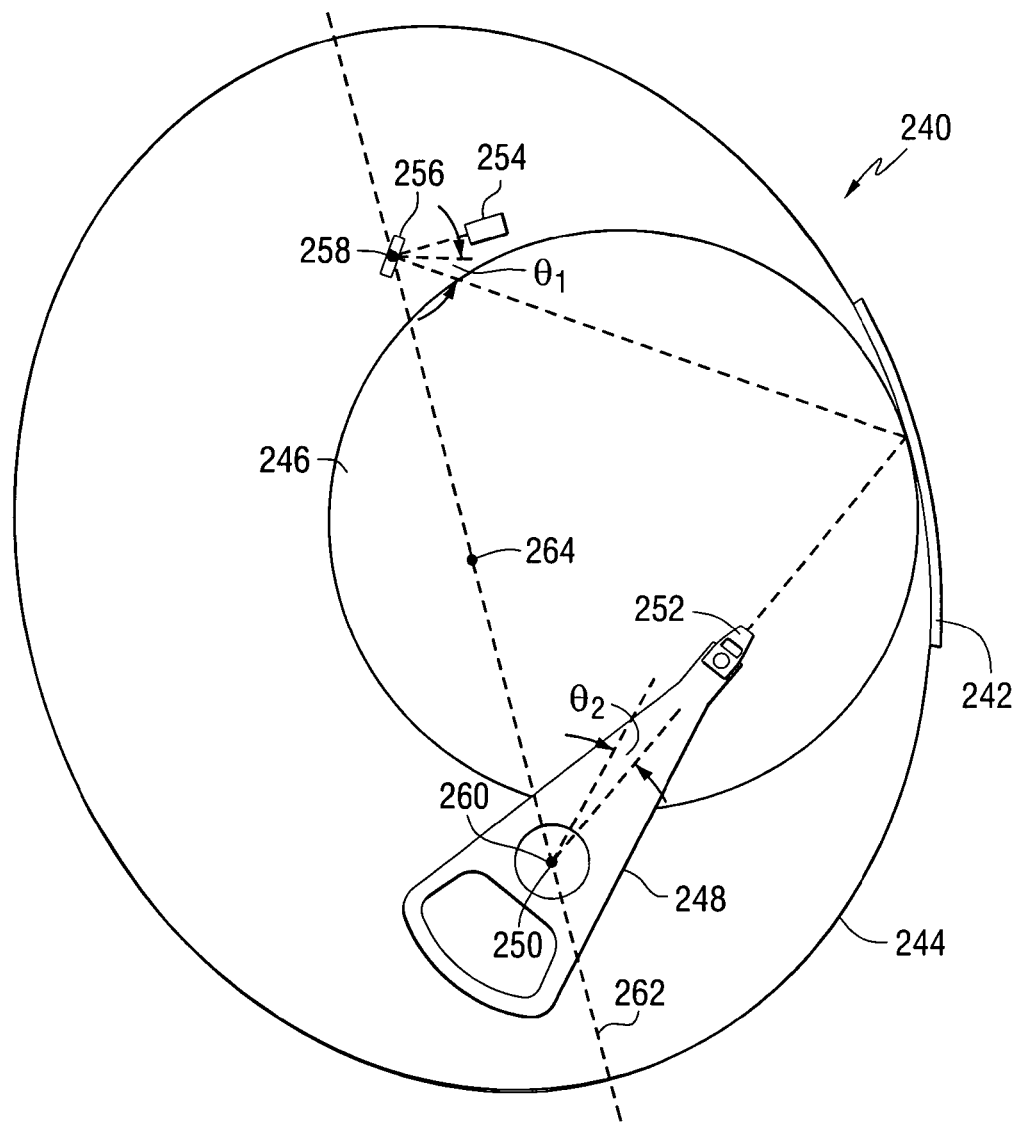

FIG. 13 is a schematic diagram of a HAMR disc drive 240 including an elliptical mirror 242 having a reflective surface that lies on an ellipse 244. The disc drive includes a storage medium in the form of a disc 246 and an actuator arm 248 mounted to pivot about a pivot axis 250. The actuator arm positions a slider 252 adjacent to a surface of the disc. The slider includes an optical transducer that may include a planar waveguide and a coupling structure, such as a grating, for coupling light into the waveguide. Light that is incident onto the coupling structure is coupled into the waveguide and then directed to the surface of the disc. A source of electromagnetic radiation 254, also referred to herein as a light source, which may be a laser or a laser module with associated focusing optics, is mounted in a fixed position in the drive. The light source produces a beam of light that is directed toward a steerable mirror 256 (also called a steering mirror) having an axis of rotation positioned at a focus 258 of ellipse 244. The pivot axis 250 of the actuator arm is positioned at a second focus 260 of the ellipse.

The two foci 258 and 260 of the ellipse define the locations of the centers of rotation of the actuator arm 248 and the steerable mirror 256. The output beam of the stationary laser module (that is properly collimated and focused) hits the steering mirror 256, which reflects the light to the elliptical mirror 242. Because of the optical properties of the elliptical mirrors described above, the light will be reflected in a direction toward the center of the rotation (pivot axis) of the actuator arm. If the angle of rotation $\theta_1$ of the steerable mirror is selected properly as a function of the angle of rotation $\theta_2$ of the actuator arm, the reflected light from the elliptical mirror will be directed toward the trailing edge of the slider.

The shape of the ellipse in FIG. 13 is defined by dimensions a and b, where a>b, and where 2a is the length of the ellipse along its major axis 262 and 2b is the height of the ellipse (along its minor axis). Each of the foci 258 and 260 is located along the major axis at a distance c from the center 264 of the ellipse, where $c^2 = a^2 - b^2$. Dimensions a, b and c are defined in FIG. 7.

Figure 14:
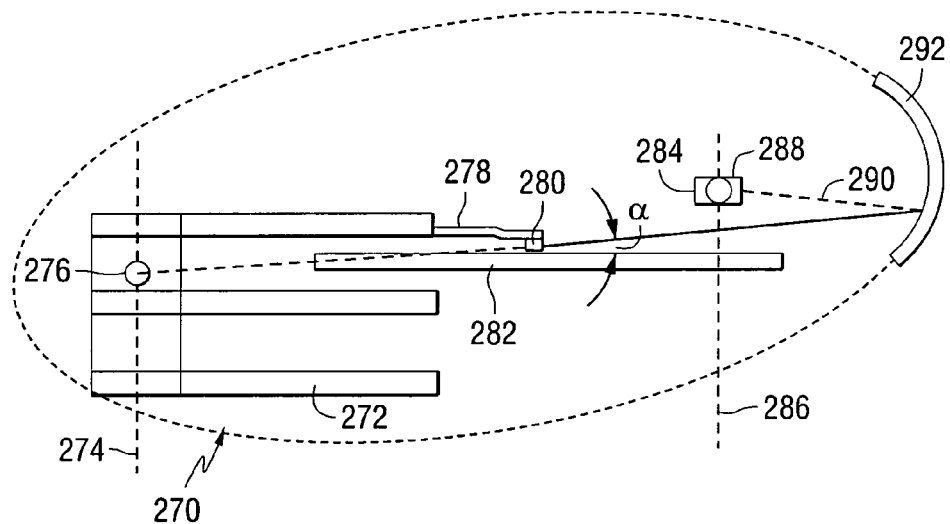
FIG. 14 is a schematic representation of a portion of a multiple disc drive.

FIG. 14 is a side view of an actuator arm 270 including an E-block 272, which is mounted to pivot about an axis 274 that passes through a first focus 276 of an ellipsoid. The E-block can support a plurality of suspensions, such as suspension 278, that are used to position a plurality of recording heads, such as recording head 280, adjacent to surfaces of a disc 282. A rotatable laser or steering mirror 284 that pivots about an axis 286, which passes through a second focus 288 of the ellipse, produces a beam 290 that reflects off of an ellipsoid shaped mirror 292 and toward a transducer on each recording head. Axes 274 and 286 are parallel to each other. A plane containing ellipsoid's foci and major and minor axis intersects with a plane of media.

Either the laser source or steering mirror is tilted to achieve the desired angle of incidence at the grating. For an ellipsoid shaped mirror, two-axis steering is required. Multiple discs are still conceivable, but more complicated.

A vertical actuator can be used to actuate a single laser to service multiple discs. This approach would eliminate the use of a laser array. In addition, it is optional to add another degree of freedom (in pitch) to the steering mirror to compensate dynamically for vertical runout (in other words, instead of using a single axis steering mirror, use a two-axis mirror having a large range in yaw but a small range in pitch). A two-axis steering mirror may be implemented using a gimbaled mirror or a single-axis mirror mounted on a small-angle actuated tilting stage.

In the case of the ellipsoid mirror, the light may be focused at the steering mirror located at one of the ellipsoid's foci, and the ellipsoid mirror will then focus the light at the slider. In the case of a straight elliptical mirror, the incident light may be focused at the slider directly to achieve a diffraction-limited system. In the latter case, an aspherical lens (or other optics) can be used to compensate for the straight elliptical mirror which only focuses light in one axis.

The light delivery technique of this invention has a number of merits. This technique can leverage the best-in-class HGA, actuator arm, voice-coil motor with minor modifications to create light accessibility to the slider trailing edge. By using drive mechanics which are essentially identical as those in traditional drives, the cost of components, tooling, and process development are likely minimized. Performance in terms of tracking, shock, flyability, etc. would not be compromised. The added elliptical mirror, actuated steering mirror, and laser (and the new head with grating), which are separate entities from existing mechanics, would be the only sources of added cost, complexity, and failure modes to create the next-generation high-density HAMR drive. Because of the compartmentalized light delivery opto-mechanics, it is conceivable that a low-cost high volume of a multi-purpose type of drives can be built where the light delivery mechanics may or may not be populated depending on the head/media combination.

In addition, for embodiments using a steerable mirror, because the laser is stationary (not attached to the moving mechanics such as the slider, suspension, or actuator arm), larger and cheaper laser diode may be used. Proper heat sinking may be implemented to ensure output stability and reliability of the laser source. By being located apart from the tight confines of the HGA, voice coil actuator, and the media, the optics and the laser module(s) can be easily accessible during drive assembly to carry out necessarily optical alignment adjustments.

In another aspect, the invention provides a method comprising: providing a moveable arm for positioning an optical transducer adjacent to a storage medium, providing a light source, and using an elliptical or ellipsoid shaped mirror mounted to reflect light from the light source to the optical transducer.

While the invention has been described in terms of several examples, it will be apparent to those skilled in the art that various changes can be made to the disclosed examples, without departing from the scope of the invention as set forth in the following claims.

What is claimed is:

1. An apparatus comprising:
   an optical transducer comprising a waveguide and a first grating for coupling light into the waveguide;
   a first moveable arm having a pivot axis at a first focus of an ellipse for positioning the optical transducer adjacent to a storage medium;
   a movable mirror having an axis of rotation at a second focus of the ellipse;
   a light source directing light onto the movable mirror; and an elliptical or ellipsoid shaped mirror including a reflective surface on the ellipse and mounted to receive the light reflected from the movable mirror and to reflect the light to the optical transducer, wherein an angle of rotation of the movable minor is a function of an angle of rotation of the movable arm.

2. The apparatus of claim 1, wherein the reflective surface of the elliptical mirror lies on either a right elliptical cylinder or on a fully elliptical surface.

3. The apparatus of claim 2, wherein the light source comprises a fixed laser.

4. The apparatus of claim 1, further comprising an actuator for controlling the yaw and pitch of the moveable mirror.

5. The apparatus of claim 1, further comprising an actuator for rotating the moveable mirror through an angle of θ/2 when the moveable arm rotates through an angle of θ.

6. The apparatus of claim 1, further comprising an actuator for moving the movable mirror linearly along the second axis.

7. An apparatus comprising:
   an optical transducer comprising a waveguide and a first grating for coupling light into the waveguide;
   a moveable arm having a first pivot axis at a first focus of an ellipse for positioning the optical transducer adjacent to a storage medium;
   a moveable laser mounted to pivot about a second pivot axis at a second focus of the ellipse; and
   an elliptical or ellipsoid shaped minor including a reflective surface on the ellipse and mounted to receive light from the laser and to reflect the light to the optical transducer, wherein an angle of rotation of the movable laser is a function of an angle of rotation of the movable arm.

8. The apparatus of claim 7, further comprising an actuator for controlling the yaw and pitch of the laser.

9. The apparatus of claim 7, further comprising an actuator for rotating the laser through an angle of θ when the moveable arm rotates through an angle of θ.

10. The apparatus of claim 7, further comprising an actuator for moving the laser linearly along the second pivot axis.

11. The apparatus of claim 1, wherein the elliptical or ellipsoid shaped mirror is mounted on a damper plate or a lid of a disc drive.

12. The apparatus of claim 1, wherein the ellipsoid shaped mirror is positioned on an ellipsoid.

13. The apparatus of claim 1, further comprising:
   a second moveable arm for positioning a second optical transducer adjacent to a second storage medium.

14. The apparatus of claim 13, wherein the first and second moveable arms each pivot about the first focus of the ellipse.

15. A method comprising:
   providing an optical transducer comprising a waveguide and a first grating for coupling light into the waveguide;
   providing a moveable arm that pivots about a first axis passing through a first focus of an ellipse for positioning the optical transducer adjacent to a storage medium;
   providing a movable mirror having an axis of rotation at a second focus of the ellipse;
   providing a light source directing light onto the movable mirror; and
   using an elliptical or ellipsoid shaped mirror to receive the light reflected from the movable mirror and to reflect the light to the optical transducer, wherein an angle of rotation of the movable mirror is a function of an angle of rotation of the movable arm.

16. The method of claim 15, wherein the elliptical minor is positioned on an ellipse.

17. The method of claim 16, further comprising:
   focusing the light onto the optical transducer.

18. The method of claim 15, wherein the ellipsoid shaped minor is positioned on an ellipsoid.

* * * * *

UNITED STATES PATENT AND TRADEMARK OFFICE
CERTIFICATE OF CORRECTION

PATENT NO. : 7,796,487 B2  Page 1 of 1
APPLICATION NO. : 11/125556
DATED : September 14, 2010
INVENTOR(S) : Patrick Breckow Chu et al.

It is certified that error appears in the above-identified patent and that said Letters Patent is hereby corrected as shown below:

Title Page item [57] Abstract, Line 9,
"minor" should read --mirror--

Signed and Sealed this

Sixteenth Day of November, 2010

David J. Kappos
*Director of the United States Patent and Trademark Office*